United States Patent
Couts et al.

(10) Patent No.: US 7,499,973 B2
(45) Date of Patent: Mar. 3, 2009

(54) SYSTEM AND METHOD FOR AUTOMATICALLY FORWARDING A COMMUNICATION MESSAGE

(75) Inventors: Jeffrey David Couts, Fort Worth, TX (US); Uday C. Sagi, Fort Worth, TX (US); Dwight Randall Smith, Grapevine, TX (US)

(73) Assignee: Motorola, Inc., Schaumburg, IL (US)

(*) Notice: Subject to any disclaimer, the term of this patent is extended or adjusted under 35 U.S.C. 154(b) by 528 days.

(21) Appl. No.: 10/036,790

(22) Filed: Dec. 21, 2001

(65) Prior Publication Data

US 2003/0120805 A1 Jun. 26, 2003

(51) Int. Cl.
*G06F 15/16* (2006.01)
*G06F 15/173* (2006.01)

(52) U.S. Cl. .............. 709/206; 709/204; 709/238; 709/239

(58) Field of Classification Search ........... 709/206, 709/238
See application file for complete search history.

(56) References Cited

U.S. PATENT DOCUMENTS

| | | | |
|---|---|---|---|
| 4,677,663 A | 6/1987 | Szlam | |
| 5,579,375 A | 11/1996 | Ginter | |
| 5,752,191 A | 5/1998 | Fuller et al. | |
| 5,764,639 A * | 6/1998 | Staples et al. | 370/401 |
| 5,889,845 A * | 3/1999 | Staples et al. | 379/211.02 |
| 5,915,010 A * | 6/1999 | McCalmont | 379/212.01 |
| 6,005,870 A | 12/1999 | Leung et al. | |
| 6,147,977 A | 11/2000 | Thro et al. | |
| 6,249,815 B1 | 6/2001 | Foladare et al. | |
| 6,260,148 B1 | 7/2001 | Aggarwal et al. | |
| 6,301,339 B1 * | 10/2001 | Staples et al. | 379/93.01 |
| 6,301,609 B1 | 10/2001 | Aravamudan et al. | |
| 6,430,604 B1 * | 8/2002 | Ogle et al. | 709/207 |
| 6,631,186 B1 * | 10/2003 | Adams et al. | 379/201.12 |
| 6,658,095 B1 * | 12/2003 | Yoakum et al. | 379/93.01 |
| 6,934,376 B1 * | 8/2005 | McLaughlin et al. | 379/212.01 |

(Continued)

OTHER PUBLICATIONS

Jain, Ravi et al, "A Forwarding Strategy to Reduce Network Impacts of PCS," Apr. 1995, IEEE, vol. 2, pp. 481-489.*
Sevanto, Jarkko, "Multimedia Messaging Service for GPRS and UMTS," Sep. 1999, IEEE, vol. 3, pp. 1422-1426.*
Jain, Ravi et al, "A Forwarding Strategy to Reduce Network Impacts of PCS," Apr. 1995, IEEE, vol. 2, pp. 481-489.*

(Continued)

*Primary Examiner*—Jason Cardone
*Assistant Examiner*—Azizul Choudhury
(74) *Attorney, Agent, or Firm*—Hisashi D. Watanabe

(57) ABSTRACT

The invention is a data network system (110) and method for forwarding a communication message intended for one device to another device. A target user of a target device (one of 102-108) configures configuration data of the target device for the system. The configuration information includes one or more forwarding lists in which each forwarding list identifies at least one next device (another one of 102-108). The system then receives (204) a communication message from an originating device (yet another one of 102-108) and retrieves (206) configuration data of the target device. Next, the system determines (208) whether the target device is available for interactive communication with the originating device based on the configuration data. If the target device is available for interactive communication with the originating device, then the system routes (210) the communication message to the target device. On the other hand, if the target device is unavailable for interactive communication with the originating device, then the system forwards (228) the communication message to a particular next device identified by the forwarding list.

23 Claims, 2 Drawing Sheets

U.S. PATENT DOCUMENTS

| | | | |
|---|---|---|---|
| 7,035,923 B1 * | 4/2006 | Yoakum et al. | 709/224 |
| 7,065,186 B1 * | 6/2006 | Myers et al. | 379/88.17 |
| 7,167,546 B2 * | 1/2007 | Moore | 379/88.12 |
| 2002/0035605 A1 * | 3/2002 | McDowell et al. | 709/206 |
| 2002/0055975 A1 * | 5/2002 | Petrovykh | 709/205 |
| 2002/0065894 A1 * | 5/2002 | Dalal et al. | 709/206 |
| 2002/0078151 A1 * | 6/2002 | Wickam et al. | 709/204 |
| 2003/0009530 A1 * | 1/2003 | Philonenko et al. | 709/206 |

OTHER PUBLICATIONS

Sevanto, Jarko, "Multimedia Messaging Service for GPRS and UMTS," Sep. 1999, IEEE, vol. 3, pp. 1422-1426.*

* cited by examiner

SYSTEM AND METHOD FOR AUTOMATICALLY FORWARDING A COMMUNICATION MESSAGE

FIELD OF THE INVENTION

The present invention relates generally to the field of messaging systems and, more particularly, to an instant messaging system and method for automatically forwarding a communication message intended for one client device to another client device.

BACKGROUND OF THE INVENTION

An instant messaging ("IM") system generally includes a plurality of client devices coupled to a server or servers of a data network. The client devices typically provide the ability to track and display the presence status of other users connected to the server of the data network. Presence status about other users is organized into contact lists or buddy lists. Each entry in the contact list corresponds to a user of the IM system, or more specifically the user's client device, and includes presence status associated with each entry. Users of the client devices desire up-to-date presence status about the members of their contact list. Although presence information may be passed on a client device, more typically the presence information is associated with a predetermined presence status, such as online or off-line, that is passed on to the client device.

IM systems are designed to handle real-time communications between client devices and do not typically provide features for dealing with unavailable users. IM users are expected to contact users on their contact lists who are available to communicate while ignoring other users who are not available. Thus, IM systems generally are not designed to provide automatic forwarding of incoming messages when an intended, target user is not available.

E-mail systems are known to automatically forward incoming e-mail messages, whether or not the target users are available. For example, the Microsoft® Outlook® application by Microsoft Corporation of Redmond, Wash., includes an "Out of Office Assistant" feature that receives an incoming e-mail message intended for one e-mail address and forwards it to another e-mail address. The Outlook application is capable of discerning the type of incoming e-mail messages that should be forwarded to the other e-mail address based on information contained within the incoming e-mail messages. Thus, such-e-mail servers and applications are limited since their forwarding decisions are based only on information contained within each incoming e-mail message.

Accordingly, there is a need for a more informative system for communicating among users and their client devices. More particularly, there is a need for a messaging system that provides automatic forwarding of messages intended for a target device based on additional configuration data, particularly information about the originating and/or target device, as well as the incoming messages themselves.

SUMMARY OF THE INVENTION

The present invention is a method for forwarding a communication message intended for one device to another device. Initially, a target client device or, more particularly, a target user, configures configuration data of the target client device for the system. The configuration information includes one or more forwarding lists in which each forwarding list identifies at least one next device. The system then receives a communication message from an originating client device and retrieves configuration data of the target client device. Next, the system determines whether the target client device is available for interactive communication with the originating client device based on the configuration data. If the target device is available for interactive communication with the originating device, then the system routes the communication message to the target device. On the other hand, if the target device is unavailable for interactive communication with the originating device, then the system forwards the communication message to a particular next device identified by the forwarding list.

The present invention is also a data network system for forwarding a select message communicated by a mobile station to at least one other mobile station. The data network system comprises a messaging server and a messaging proxy coupled to the messaging server. The messaging server communicates with a plurality of devices and is capable of routing a communication message from an originating device to a target device. The messaging proxy has access to a database that includes a forwarding list of the target device that identifies at least one next device. Also, the messaging proxy determines whether the target device is available for interactive communication with the originating device. If the target device is available for interactive communication with the originating device, then the messaging proxy routes the communication message to the target device. On the other hand, if the target device is unavailable for interactive communication with the originating device, then the messaging proxy forwards the communication message to a particular next device identified by the forwarding list.

DETAILED DESCRIPTION OF THE PREFERRED EMBODIMENTS

Figure 1:
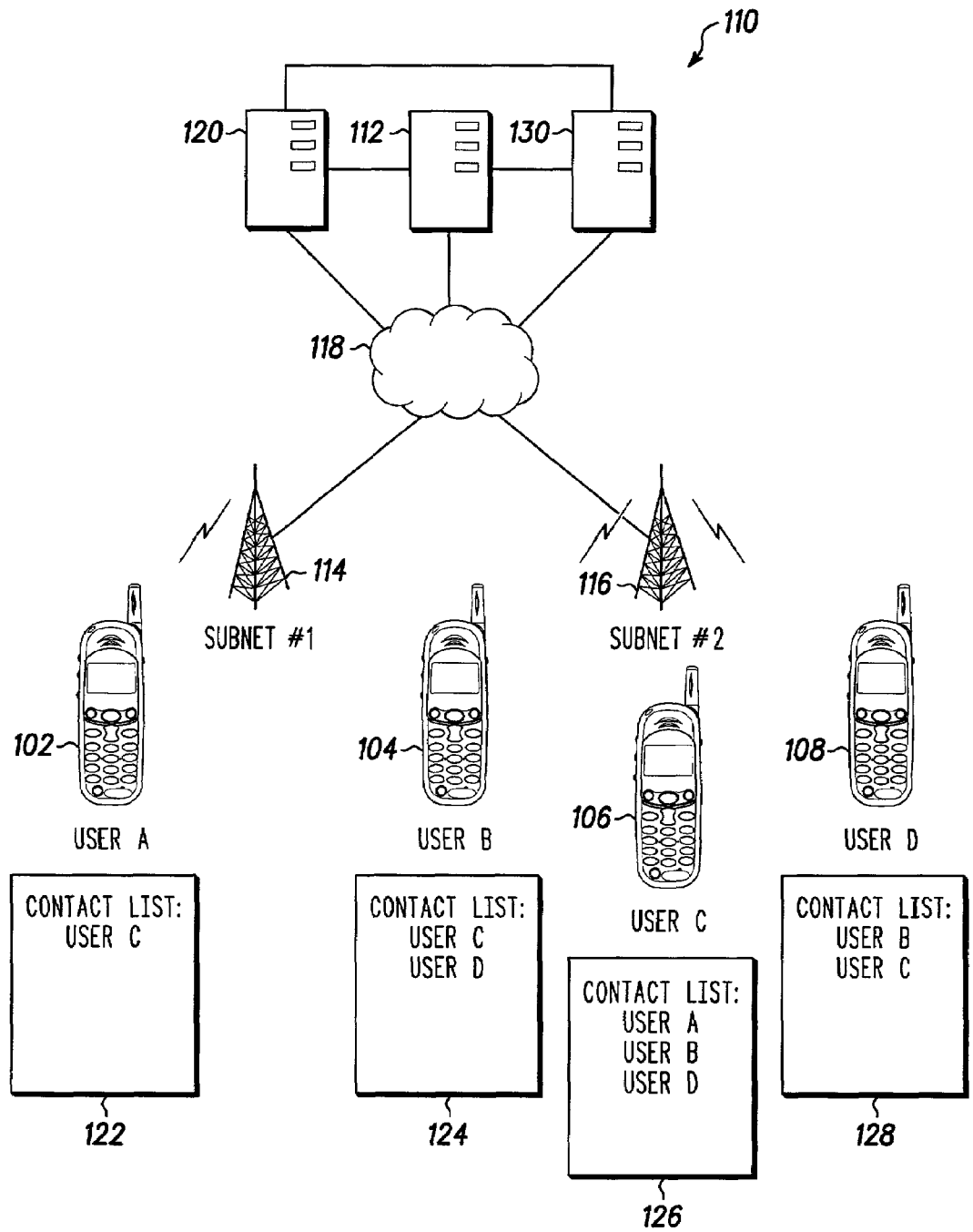
FIG. 1 is a block diagram representing a wireless communication system that may be adapted to operate in accordance with the preferred embodiment of the present invention.

The present invention is a data network system and method for automatically forwarding communication messages intended for a target device to a different device when the target device is unavailable. A potential target user may use a client application to configure a forwarding list of one or more users and define rules that would prompt the system to forward the message to another device. This client application may be stored on the target user's device or a data communication network communicating with the target user's device. If the configuration information of the forwarding list is generated within the device, then the configuration information is transmitted to a server or proxy of the data communication network after the target user prepares it.

As stated above, the data network system determines whether a target device is available or unavailable. A target device is considered to be unavailable if one or more preconfigured rules, configured by a target user of the target device, apply to a given situation. Preferably, the target user configures one or more forwarding lists and rules for all, or substantially all, possible situations in which the target device would be unavailable. For example, a target device would configure forwarding lists and rules for situations where the target device is off-line or otherwise cannot provide a real-time response to incoming communication messages. The target device may not be able to provide a real-time response for various reasons, such as being outside of a defined area or being manually set by the target user as unavailable. On the other hand, a target device is considered to be available if none of the pre-configured rules configured by the target user apply to the given situation. For example, a target device would not configure forwarding lists and rules for situations where the target device is online and can provide a real-time response to incoming communication messages.

In a situation where the target device is off-line, the target device is not available regardless of whether a pre-configured rule exists of such situation. If the target user has not configured a forwarding list for a situation where the target device is off-line, then the incoming communication message is withheld from the target device and is not forwarded to any other device.

Whenever a target user or, more specifically, the associated target device is not available to receive an incoming message, the system forwards the message to another or next device. In particular, the system reads the forwarding list until the system finds another or next user that is available and, then, forwards the message to the available next user. Preferably, the system reads the forwarding list user-by-user or device-by-device in order of priority specified by the target user. The forwarded message is, thus, displayed to the next user of the next device in its original form or in a modified form as modified by the system. Thereafter, interactive communication is conducted in real-time between an originating user of the originating device and a next user of the next device.

As stated above, a target user may prepare one or more forwarding lists and corresponding rules that specify conditions that prompt the system to forward the communication message. Examples of forwarding lists include, but are not limited to, co-workers or business associates (e.g., "work buddies"), social eating and/or drinking companions (e.g., "beer buddies"), and acquaintances sharing a common hobby or interest (e.g., "golf buddies" and "daycare buddies"). In the particular case of an instant messaging system, a contact or buddy list may be used as a forwarding list.

Referring to FIG. 1, there is shown a preferred embodiment of the data network system of the present invention. The preferred embodiment includes a plurality of client devices 102, 104, 106, 108 associated with a data communication network 110. For purposes of illustration, the communication network 110 includes a messaging server 112, two radio subnetworks (namely subnetwork #1 114 and subnetwork #2 116), and connectivity network 118 between the client devices 102, 104, 106, 108 and the messaging server. It is to be understood that the present invention may also be applied to a different configuration of client devices and a communication network, such as a plurality of servers or connection to a wired network. The client devices 102, 104, 106, 108 and the messaging server 112 each include a processor for general operation of the messaging server and a memory for storage of applications and data.

For the example represented by the preferred embodiment, the four client devices 102, 104, 106, 108 are labeled User A, User B, User C, and User D respectively. User A's client device 102 is on a separate radio subnetwork 114 from the subnetwork 116 of the other client devices 104, 106, 108. User B's, User C's and User D's client devices 104, 106, 108 can receive communications sent by a base station of subnetwork #2 116 and are on a separate radio subnetwork 114 from User A's client device 102. In practical situations, there will be many more radios, subnets and contact lists (or buddy lists).

The client devices 102, 104, 106, 108 of the preferred embodiment shown in FIG. 1 are radiotelephones for communication using a wireless communication system, such as a standard cellular telephone system. Although the preferred embodiment described herein utilizes radiotelephones, one skilled in the art will recognize that the features discussed will also find application in other types of client devices such as cordless telephones, personal digital assistants, two-way radios, pagers, portable computers, multi-functional communication devices and the like.

The preferred embodiment also includes a messaging proxy 120 that operates on behalf of a user by establishing a connection to the messaging server 112 and operating accordingly. The messaging proxy is coupled to one or both of the following components: the messaging server 112 and the connectivity network 118. As shown in FIG. 1, the messaging proxy 120 may run from an independent server to act as the user and be invoked by the user as needed. Also, the messaging proxy 120 can operate as a gateway proxy to maintain a persistent connection on the user's behalf. All messaging traffic is communicated through the gateway and enabled by the user directly, such as enabling an "offline" mode while remaining on the network, or automatically if the gateway proxy is unable to communicate with the user's client device. In the alternative, the messaging proxy 120 may be incorporated within the messaging server 112, thus the messaging proxy and messaging server act as a single unit.

Each client device 102, 104, 106, 108 includes at least one contact list 122, 124, 126, 128 (a.k.a. a buddy list) that is capable of identifying one or more of the other client devices connected to the communication network 110. Each contact list 122, 124, 126, 128 may identify none or at least one of the client devices 102, 104, 106, 108 connected to the communication network 110. A particular client device 102, 104, 106, 108 would include a contact list 122, 124, 126, 128 that identifies other client devices, but the contact list would not identify the particular client device itself. In FIG. 1, the contact lists 122, 124, 126, 128 are shown beneath the client devices 102, 104, 106, 108. However, for the present invention, each contact list 122, 124, 126, 128 is stored in a memory of the respective client device 102, 104, 106, 108, or collectively stored in a memory located in the communication network 110. For the preferred embodiment, the contact lists 122, 124, 126, 128 are stored in a memory of the messaging server 112. The contact lists 122, 124, 126, 128 may also identify a group or collection of users in addition to, or instead of, individual users. In addition, each client device 102, 104, 106, 108 may have more than one contact list.

For the preferred embodiment, users of the client devices 102, 104, 106, 108 utilize client software stored by the client devices that offer the ability to track and display the presence status of other users connected to the communication network 110. Each entry of the contact lists 122, 124, 126, 128 corresponds to another user or, more particularly, another client device 102, 104, 106, 108 connected to the communication network 110. Information about the user and/or client device 102, 104, 106, 108 may be associated with each entry including, but not limited to, presence information such as online status (e.g., available to communicate), off-line status (e.g., unavailable), location attribute & capabilities, device attributes & capabilities, communication network attributes & capabilities (e.g., network resource availability). Presence information is generally dynamic in nature, changing over time based on various factors and conditions. Thus, updates to the presence information must be transmitted to relevant client devices 102, 104, 106, 108 to update their respective contact lists 122, 124, 126, 128.

In some environments, a collection of users may have similar, if not identical, contact lists 122, 124, 126, 128. For example, a circle of friends may list each other in their contact lists 122, 124, 126, 128, possibly along with other people. In a work environment, work team members may include each other in their contact lists 122, 124, 126, 128, such as a "work buddies" contact list. In some work team environments, the contact lists 122, 124, 126, 128 will be identical amongst all members of the team.

The preferred embodiment may further include a location register 130, such as a mobile switching center ("MSC") and/or a visitor location register ("VLR"). The location register 130 is coupled to at least one of the components: the messaging server 112, the connectivity network 118 and the messaging proxy 120. The location register 130 is capable of routing calls to and from the client devices 102, 104, 106, 108 as well as tracking location information of the client devices. The location register 130 may determine location information, directly or indirectly via the client devices 102, 104, 106, 108, using a variety of techniques including, but not limited to, a global positioning system ("GPS") technique, a forward link trilateration ("FLT") technique, an advanced forward link trilateration ("AFLT") technique, an amplitude difference angle of arrival ("AD-AOA") technique, and an enhanced observed time difference ("EOTD") technique. The location register 130 may also determine the positions of the client devices 102, 104, 106, 108 from another entity via a wireless communication link, such as Bluetooth™ wireless technology which is supported by the Bluetooth™ Special Interest Group, HomeRF™0 which is supported by the HomeRF™ Working Group, and Wi-Fi (IEEE 802.11b) which is supported by the Institute of Electrical and Electronics Engineers and the Wireless Ethernet Compatibility Alliance.

Figure 2:
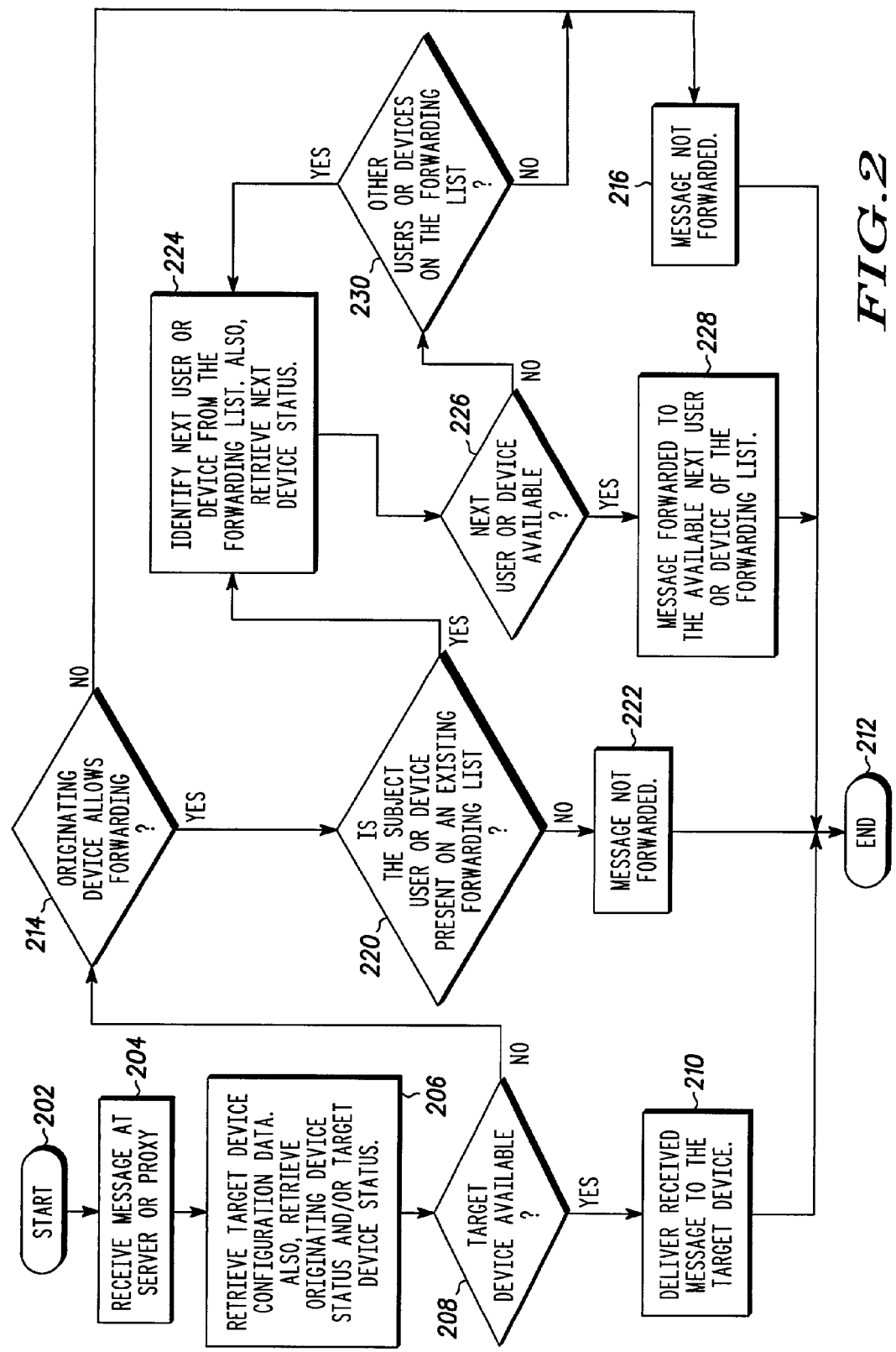
FIG. 2 is a flow diagram representing first and second preferred methods for forwarding text messages that may be adapted to operate in accordance with the preferred embodiment of FIG. 1.

Referring to FIG. 2, there is provided a first preferred method for forwarding communication messages that may be adapted to operate in accordance with the first preferred embodiment described above. Before the first preferred method shown in FIG. 2 is executed, one or more forwarding lists and corresponding rules are generated for a particular device. The forwarding lists may be custom-tailored by each individual user of a device.

The forwarding lists and corresponding rules for the target device are directed to situations where the target user is unavailable. By reviewing the presence (such as online or off-line) of the target device and the identity of the originating device, as defined by the configuration data of the target device, the system may determine whether the target device is available. More particularly, if the target device is off-line or if the target device is online and the originating device belongs in an applicable forwarding list, then the target device is considered to be unavailable. Otherwise, if the target device is online and the originating device does not belong to an applicable forwarding list, then the target device is considered to be available.

After initiating the first preferred method at step 202, the messaging proxy 120 receives a communication message from an originating device, such as client devices 102, 104, 106, 108, in step 204. Although the messaging proxy 120 is described herein as performing the steps of the preferred methods of the present invention, it is to be understood that these steps (or a portion thereof) may be performed in conjunction with, or instead by, the messaging server 112.

Next, in step 206, the messaging proxy 120 retrieves configuration data of the target device from a database. The database may be located at the messaging server 112, the messaging proxy 120, or shared between the two components. For the first preferred embodiment, the database is located at the messaging proxy 120. The configuration data includes one or more forwarding lists and corresponding rules configured by the target device in advance of executing the steps shown in FIG. 2. In addition, the messaging proxy 120 determines the status of the originating device, the status of the target device or the statuses of both devices, whichever status information is necessary to determine the availability of the target device. For the first preferred method, the messaging proxy 120 determines the presence of the target device and is capable determining the identity of the originating device at step 206. However, for the first preferred method, the identity of the originating device is determined from the communication message received at step 204.

The messaging proxy 120 then determines, at step 208, whether the target device is available for interactive communication by comparing the retrieved status information against the retrieved configuration data. For the first preferred method, the messaging proxy 120 is able determine that the target device is available when the target device is online and the originating device does not belong to an applicable Classification. The target device is not available when the device is off-line or the originating device belongs in an applicable forwarding list. If the target device is available, then the messaging proxy 120 will deliver the communication message to the target device at step 210. Thereafter, the method terminates at step 212.

The preferred methods described herein also provide one or more privacy features for the originating device, the target device and each next device. These privacy features are beneficial to these devices and are optional for the data network system. Thus, referring to step 214, if the target device is not available, then the messaging proxy 120 determines whether the originating device allows forwarding of messages. Preferably, the status information of the originating device, retrieved at step 206, indicates whether the originating device allows forwarding of messages. If the originating device does not allow forwarding, then the communication message is not forwarded as provided by step 216 and the method terminates at step 212.

If the originating device allows forwarding, then the messaging proxy 120 determines whether an existing forwarding list present in the database includes a subject device (i.e., the originating device or target device) and/or its corresponding user in step 220. Preferably, the subject device is the target device and the forwarding list is a contact list of the originating devices and/or users. However, in the alternative, the subject device may be the originating device and the forwarding list may be a contact of the target devices and/or users. If none of the forwarding lists includes the subject device or its corresponding user, then the messaging proxy 120 does not forward the message as represented by step 222 and the method terminates at step 212. Otherwise, if one or more forwarding lists includes the subject device or its corresponding user, then the messaging proxy 120 identifies the next user or device from the appropriate forwarding list in step 224. If more than one forwarding list includes the subject device or its corresponding user, then the messaging proxy 120 would select the first forwarding list available. Also, at step 224, the messaging proxy 120 retrieves status information of the next device.

After identifying the next user or device, the messaging proxy 120 determines whether the identified next user or device is available for interactive communication in step 226. Preferably, the availability of the next user or device is determined from the status information of the next device retrieved at step 224. For the first preferred method, the next device and corresponding user is considered to be available when the next device is online, and the next device and corresponding user is not considered to be available when the next device is off-line. If the identified next user or device is available, then the communication message is forwarded to the available next user or device and the method terminates at step 212.

If the identified next user or device is not available, then the messaging proxy 120 determines whether other users or devices (who or which have not yet been identified) are still in the forwarding list in step 230. If other users or devices are not in the forwarding list, then the communication message is not forwarded as provided by step 216 and the method terminates at step 212. On the other hand, if other users or devices are in the forwarding list, then the messaging proxy 120 selects another next user or device from the forwarding list in step 224 and determines whether the selected next user or device is available in step 226. If the most recent next user is available, then the messaging proxy 120 executes steps 228 and 212. Otherwise, the messaging proxy 120 repeats steps 224, 226 and 230 as necessary until step 212 is reached.

FIG. 2 also represents a second preferred method for forwarding communication messages that may be adapted to operate in accordance with the preferred embodiment described above. Similar to the first preferred method, one or more forwarding lists and corresponding rules are generated for a particular device for the second preferred method. Also, similar to the first preferred method, it is to be understood that these steps (or a portion thereof) may be performed by the messaging proxy 102, the messaging server 112 or both the proxy and server. It is important to note that the first preferred method determines availability based on rules for configuration of the originating device, namely the identity of the originating device, whereas the second preferred method determines availability based on rules for configuration of the target device, namely the location of the target device. Thus, for the present invention, availability of the target device may be determined by one or more rules for configuration of the originating device and/or one or more rules for configuration of the target device.

Although the second preferred method is substantially similar to the first preferred method described above, the second preferred method includes an additional condition, namely location, for determining whether the target device is available. Rules for forwarding lists may be configured to include as many conditions as desired by the user. By reviewing the presence and location of the target device, as defined by the configuration data of the target device for the second preferred method, the system may determine whether the target device is available. An example of such information provided in the configuration data of the target device is represented below in Table 2.

TABLE 1

Rules For The Forwarding List of The Second Preferred Method

| Presence | Location | Reported Status | Forwarding Status | Action |
|----------|----------|-----------------|-------------------|--------|
| Online | Region 1 (e.g., Home Area) | Available | Available | Message Sent To Target Device. |
| Online | Region 2 (e.g., Work Area) | Available | Available | Message Sent To Target Device. |
| Online | Region 3 (e.g., Out-of-town) | Available | Unavailable | Message Forwarded To Next Device. |

TABLE 1-continued

Rules For The Forwarding List of The Second Preferred Method

| Presence | Location | Reported Status | Forwarding Status | Action |
|----------|----------|-----------------|-------------------|--------|
| Off-line | <None> | Unavailable | Unavailable | Message Forwarded To Next Device. |

*Assumes Forwarding List Present For The Subject User.

By reviewing the presence and the location of the target device, as defined by the configuration data of the target device, the system may determine whether the target device is available. More particularly, if the target device is off-line or if the target device is online and is located in a region where it is not available (for second preferred method, Region 3), then the target device is considered to be unavailable and the communication message is forwarded. Otherwise, if the target device is online and is located in a region where it is available (for the second preferred method, Regions 2 and 3), then the target device is considered to be available and the communication message is sent to the target device.

Table 1 above provides a reported status and a forwarding status. The reported status is provided to devices that desire to know the status of the target device, whereas the forwarding status is utilized by the messaging proxy 120 to determine whether to send an incoming communication message to the target device or forward it to a next device. Also, the reported status corresponds to the presence information and is not updated based on the location information. The forwarding status is known by the messaging proxy 120 but is not known by other devices, including the originating device. For the second preferred method, the target device is actually available for interactive communication in Regions 1 and 2 if it is online, but the target device is not available for interactive communication in Region 3.

Although most steps of the second preferred method have operations similar to the first preferred method, certain steps are different. In particular, the messaging proxy 120 determines the presence and location of the target device at step 206. The messaging proxy 120 then determines, at step 208, whether the target device is available for interactive communication by comparing the retrieved status information against the retrieved configuration data. For the second preferred method, the messaging proxy 120 is able determine that the target device is available when the target device is online and is located in Region 1 or Region 2. The target device is not available when the target device is off-line or the target device is located in Region 3.

Likewise, location information is used to determine the availability of a next device at step 226. The messaging proxy 120 determines whether the identified next user or device is available for interactive communication at step 226. Preferably, the availability of the next user or device is determined from the status information of the next device retrieved at step 224. For the second preferred method, the next device and corresponding user is considered to be available when the next device is online and is located in Region 1 or Region 2, and the next device and corresponding user is not considered to be available when the next device is off-line or is located in Region 3. Otherwise, as stated above, steps of the second preferred method have operations similar to the first preferred method.

The preferred embodiment described above permits a user to establish more than one separate forwarding list. For example, a user may generate a "golf buddies" list to forward messages among certain golfers, and a "daycare buddies" list to forward message among certain daycare parents. Thus, if an originating user of an originating device desires someone to pick-up his or her son from daycare early, only parents from the "daycare buddies" list would be presented with the particular request from the originating user.

As stated above in reference to FIG. 2, the present invention also provides privacy features for the originating device, the target device and each next device. For example, if an originating user does not desire to have his or her messages forwarded, the originating user may, via the originating device, inform the messaging server and/or messaging proxy 120 accordingly or manage them on a message-by-message basis. If the originating device informs the messaging server 112 and/or messaging proxy 120 accordingly, the messaging server and/or messaging proxy would not forward messages from the originating user. If managed on a message-by-message basis, the user may mark specific messages as private or be queried by the messaging server 112 and/or messaging proxy 120. For example, the messaging proxy 120 may send a message to the originating device stating, "User is not available. Would you like to have your message forwarded?" The message would not be forwarded unless an affirmative response is received from the originating device.

The present invention may also provide privacy of the target user. For example, the messaging server 112 and/or messaging proxy 120 may require authorization to be received from a next user if a target user desires to add the next user to his or her forwarding list.

The present invention further includes the ability to modify received messages before forwarding them to another user and, likewise, modifying responses to forwarded message. For example, for the privacy of the other or next users, the next users may desire to respond to the originating user without disclosing their identity. For example, the messaging server 112 and/or messaging proxy 120 may represent a next user as a "friend of User A" instead of by his or her actual identity. Also, for example, the messaging server 112 and/or messaging proxy 120 may add an instruction of the next user, including the next user's identity, to let the originating user know why someone other than the target user is sending the response.

As another example, User A may try to send a communication message to User D. User D's forwarding list includes Users A, B and C with the users listed in that particular order. If User D is not available, the messaging server 112 and/or messaging proxy 120 performs a presence check of User B (the next user on User D's forwarding list) to determine whether the message may be re-routed to User B. In reviewing the forwarding list, the messaging server 112 and/or messaging proxy 120 ignore User A, since User A is the originator of the communication message. If User B is available, then the message is directed to User B instead of User D. Accordingly, the following sequence of message exchanges may occurs:

User A to User D: "where are we meeting later?"
Server/Proxy of User D receives the message, determines that User D is not available, retrieves User D's forwarding list which identifies Users B and C (in addition to User A), and determines that User B is the next device and is available.
Server/Proxy of User D to User B: "from <User A> for <User D>—where are we meeting later?"
User B to Server/Proxy of User D: "planning on going to usual place."
Server/Proxy of User D to User A: "from <User B> for <User D>—planning on going to usual place."

Since all messaging traffic passes through the messaging server 112 and/or messaging proxy 120, the messaging server and/or messaging proxy may also block or obscure user identities as well. In the example above, it is possible for Users A and B to exchange messages without knowing each other's identities since all messages may be directed to User D. Thus, the indicators for <User A> and <User B> above may be replaced by generic words such as "friend", "buddy", "another user", and the like.

While the preferred embodiment of the invention has been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for a data network system for forwarding a communication message intended for a target device associated with a target user to another device, the method comprising the steps of:
    receiving a communication message from an originating device;
    retrieving configuration information and presence information of the target device, the configuration information including a forwarding list identifying at least one next device;
    determining whether the target device is available for text messaging with the originating device based on the presence information;
    routing the communication message to the target device if the target device is available for text messaging with the originating device; and
    forwarding the communication message to a particular next device, associated with a next user, of the at least one next device of the forwarding list if the target device is unavailable for text messaging with the originating device, wherein the forwarding list is a contact or buddy list for an instant messaging system.

2. The method of claim 1, further comprising the step of configuring the configuration data of the target device before the step of receiving the communication message from the originating device.

3. The method of claim 1, further comprising the step of retrieving status information of at least one of the originating device and the target device, wherein the step of determining whether the target device is available for text messaging includes the step of comparing the status information against the configuration data to determine whether the target device is available for text messaging.

4. The method of claim 3, wherein the status information includes a location of the target device.

5. The method of claim 1, further comprising the step of determining whether the originating device is present on the forwarding list.

6. The method of claim 1, further comprising the step of identifying the particular next device as having a highest priority among the at least one next device of the forwarding list.

7. The method of claim 1, further comprising the steps of:
    determining that the particular next device is not available to receive the communication message; and
    selecting another next device of the at least one next device.

8. The method of claim 7, further comprising the step of forwarding the communication message to the another next device, instead of the particular next device, if the another next device is available for text messaging with the originating device.

9. The method of claim 1, wherein the forwarding list identifies next devices in order of priority as pre-configured for the target device.

10. The method of claim 1, wherein the forwarding list identifies next devices in order of priority based on a proximity of the next devices relative to one of either the originating device or the target device.

11. The method of claim 1, further comprising the step of prohibiting, by the originating device, forwarding of messages, received from the originating device, to other devices.

12. The method of claim 1, further comprising the step of receiving authorization from the originating device before forwarding the communication message to the particular next device.

13. The method of claim 1, further comprising the step of identifying a mark, by the originating device, in the communication message indicating that the communication message may not be forwarded to other devices.

14. The method of claim 1, further comprising the step of receiving authorization from the particular next device before the target device adds the particular next device to the forwarding list.

15. The method of claim 1, further comprising the step of modifying the communication message before forwarding the communication message to the particular next device.

16. The method of claim 15, wherein the communication message is modified to prevent the communication message from divulging an identity of the originating device to the particular next device.

17. A data network system for forwarding a select message communicated by a mobile station to at least one other mobile station, the data network system comprising:

a messaging server for communicating with a plurality of devices, the messaging server being capable of routing a communication message from an originating device to a target device associated with a target user; and a messaging proxy coupled to the messaging server, the messaging proxy having access to a database that includes a forwarding list of the target device that identifies at least one next device, the messaging proxy being effective to determine whether the target device is available for text messaging with the originating device based on presence information of the target device, route the communication message to the target device if the target device is available for text messaging with the originating device, and forward the communication message to a particular next device of the at least one next device of the forwarding list if the target device is unavailable for text messaging with the originating device, the forwarding list is a contact or buddy list for an instant messaging systems, wherein the messaging proxy selects a next user from the forwarding list until an available next user is found.

18. The data network system of claim 17, wherein the messaging proxy is incorporated within the messaging server.

19. The method of claim 17, wherein the database is stored in the messaging server.

20. The method of claim 17, wherein the database is stored in the messaging proxy.

21. The data network system of claim 17, wherein the messaging proxy determines that the originating device allows forwarding of messages.

22. The data network system of claim 17, wherein the forwarding list identifies next devices in order of priority as pre-configured for the target device.

23. The data network system of claim 17, wherein the forwarding list identifies next devices in order of priority based on a proximity of the next devices relative to one of either the originating device or the target device.

* * * * *